O. H. MARSCHUETZ, W. G. PROBST & J. C. REED.
PATTERN FOR CASTINGS.
APPLICATION FILED NOV. 22, 1907.

985,822.

Patented Mar. 7, 1911.

3 SHEETS—SHEET 1.

FIG. 3ᵃ

WITNESSES
Chas. K. Davies
E. L. Corbett

INVENTORS
O. H. Marschuetz,
W. G. Probst, and
J. C. Reed,
By Brock, Baker & Smith, Attorneys O. H. MARSCHUETZ, W. G. PROBST & J. C. REED.
PATTERN FOR CASTINGS.
APPLICATION FILED NOV. 22, 1907.

985,822.

Patented Mar. 7, 1911.

3 SHEETS—SHEET 2.

WITNESSES
Chas. K. Davies
E. L. Corbett.

INVENTORS
O. H. Marschuetz,
W. G. Probst,
J. C. Reed,
by Bock, Bicken & Smith, Attorneys

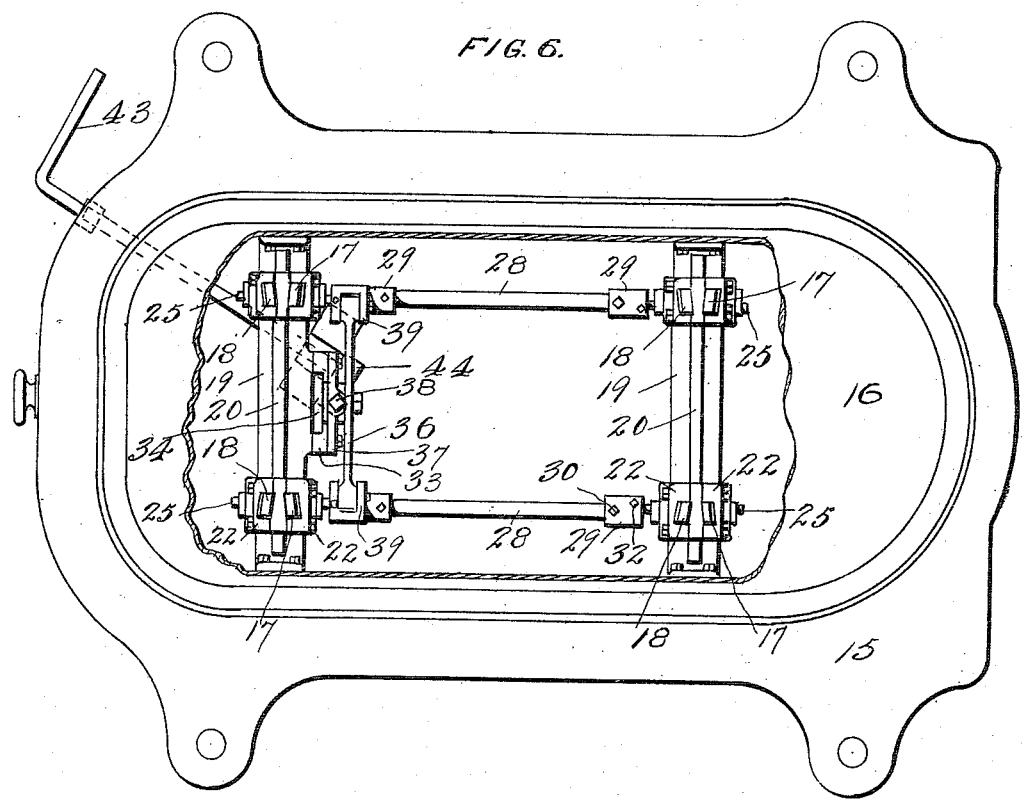

UNITED STATES PATENT OFFICE.

OSCAR H. MARSCHUETZ AND WILLIAM G. PROBST, OF LOUISVILLE, KENTUCKY, AND JOHN C. REED, OF ALLEGHENY, PENNSYLVANIA, ASSIGNORS TO STANDARD SANITARY MANUFACTURING COMPANY, OF PITTSBURG, PENNSYLVANIA, A CORPORATION OF PENNSYLVANIA.

PATTERN FOR CASTINGS.

985,822.

Specification of Letters Patent.  Patented Mar. 7, 1911.

Application filed November 22, 1907. Serial No. 403,347.

*To all whom it may concern:*

Be it known that we, OSCAR H. MARSCHUETZ and WILLIAM G. PROBST, residents of Louisville, in the State of Kentucky, and JOHN C. REED, a resident of Allegheny, in the State of Pennsylvania, citizens of the United States, have invented a certain new and useful Pattern for Castings, of which the following is a specification.

Our invention broadly relates to apparatus for and a method of forming undercuts in metal castings.

Undercuts have heretofore been formed by means of patterns of flexible composition such as gelatin and glue, and by the use of loose core patterns. We provide means for making undercuts by using a pattern provided with retractable members forming an operative part of the pattern and constructed and arranged so that accurate molds can be produced rapidly and economically.

The accompanying drawing illustrates two embodiments of the invention which are the best we have at this time devised, but various modifications may be made therein within the ability of persons skilled in the art.

Figure 1:
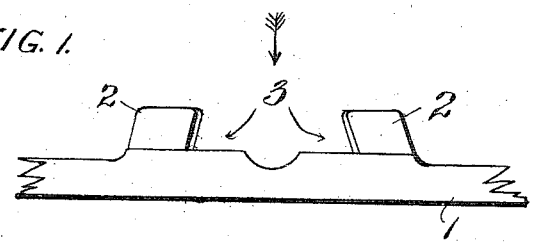
Figure 2:
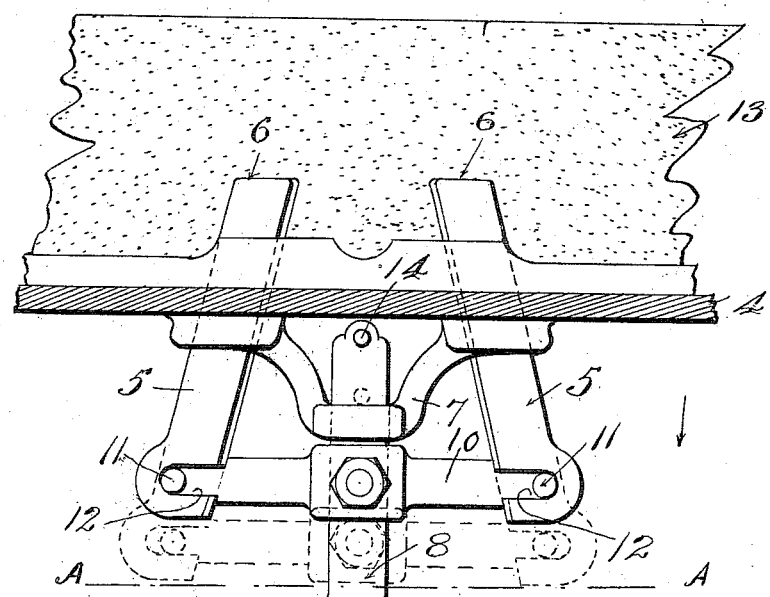
Figure 3:
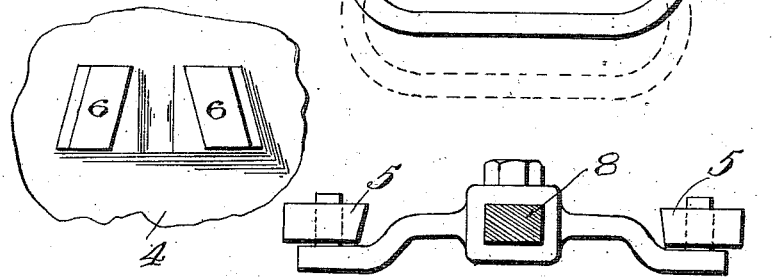
Figure 4:
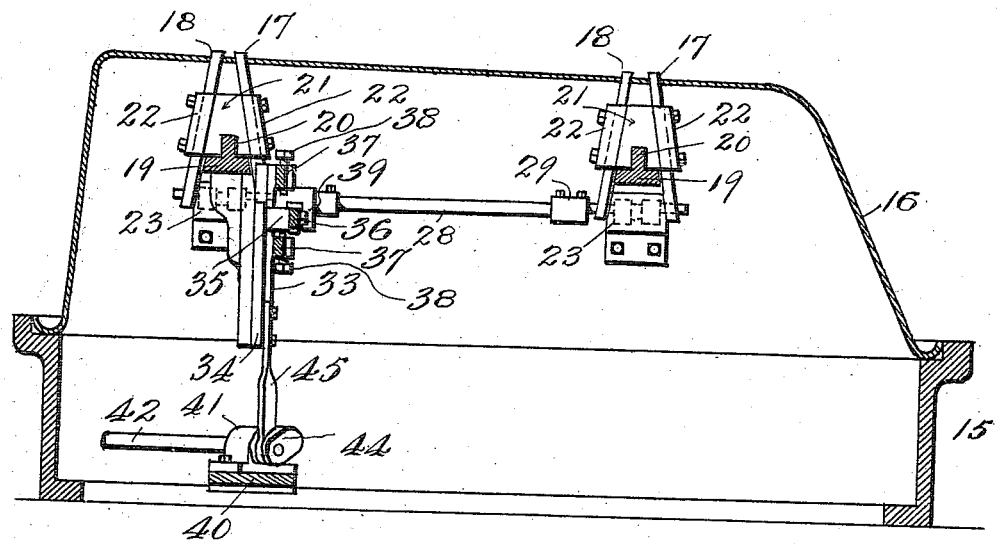
Figure 5:
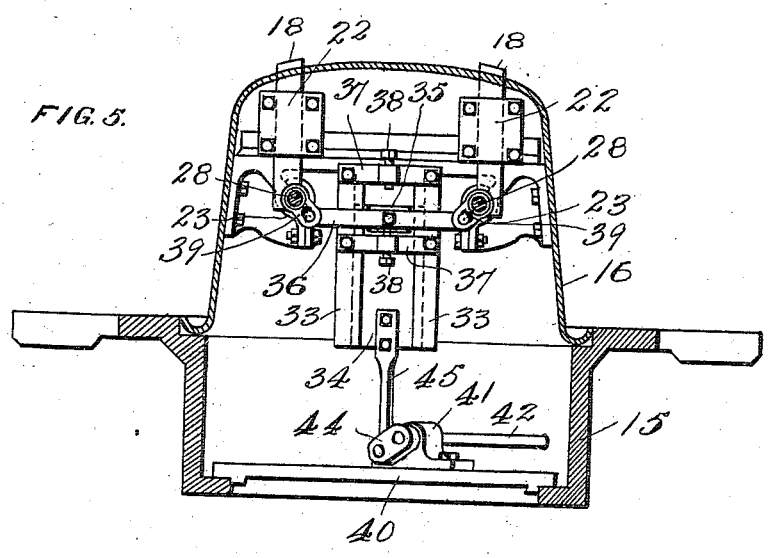

Figure 1 is a view of a fragment of a metal casting having an undercut. Fig. 2 a diagrammatic view of so much of a pattern and mold as is necessary to illustrate a simple form of the invention, Fig. 3, a detail view in section on the line A—A of Fig. 2. Fig. 3ª is a plan view of Fig. 1. Fig. 4, a longitudinal section through a tub pattern embodying our invention. Fig. 5 a transverse section of the same, Fig. 6, a plan view of the same, part of the pattern being broken away, Fig. 7, a detail of the bolt operating mechanism.

Referring first to Figs. 1 to 3, inclusive, which illustrate a simple form of the invention, Fig. 1 shows a fragment 1 of a metal casting having projections or lugs 2, the upper ends of which converge, forming an undercut 3. Under ordinary conditions, as the molding art has been practiced up to the present time, if the article of Fig. 1 is to be cast from a mold formed on a pattern which conditions require must be withdrawn from the mold in the direction of the arrow, it has been necessary to make the mold of flexible material, to destroy the pattern in clearing the mold or to provide loose pattern sections or cores. We provide a pattern with retractable members, which in extended position, form the mold depressions for lugs 2, and which, when retracted, permit the pattern to be drawn in the direction indicated, leaving the mold in perfect condition for the cast. This mechanism will now be described.

In Fig. 2, numeral 4 designates a fragment of a pattern corresponding to the body 1 of the desired casting. The pattern is provided with slots through which pass bolts 5, the outer ends 6 of which correspond to the lugs 2 in the completed article. On the side of the pattern away from the mold is a bracket 7 serving as a guide for a rod 8 to which is connected a handle 9. The rod carries a cross-piece 10 on which are pins 11, each engaging a slot 12 formed in the inner end of one of the bolts. To form a mold, the bolts are projected to the position shown in Fig. 2 by moving handle 9 toward the body of the pattern, the bolts being retained in this position by any suitable means. The mold 13 is now rammed upon the pattern. The bolts are then withdrawn into the body of the pattern by pulling down handle 9, a stop 14 being provided to limit the retracting movement of the handle. The pattern may then be withdrawn in the direction of the arrow or, in fact, in various other directions if conditions require it, without interfering with the undercut depression in the molds. In some cases, the mold may be rammed up with the bolts in the retracted position and the undercut depressions then formed by moving handle 9 toward the pattern and thus projecting the bolts in the substance of the mold. Upon again retracting the bolts, the pattern may be withdrawn as above described.

It is evident that the invention provides means for forming a depression in the mold at an angle to the direction in which the pattern must be withdrawn. For instance, a single bolt 6 may be provided which will form a single depression in the mold, the forming of which in any other patterns of which we have knowledge, if withdrawn in the direction of the arrow, would require loose core prints or a destructible pattern or other expedients which we avoid. By providing retractable pattern members of various shapes and arrangements and suitable operating means therefor, it is evident that undercuts and mold depressions of widely varying character may be quickly and accurately formed.

An embodiment of the invention which has been designed with especial reference to the projection of molds for bath tubs will now be described with reference to Figs. 4 to 7, inclusive.

Reference numeral 15 designates a pattern support or molding stand upon which rests in inverted position a pattern 16 having the contour of the inner surface of a tub. It is desired to cast integral with the tub at as many points as there are legs on the finished article, pairs of lugs or "doves" for the attachment of the separately formed legs. For this purpose the pattern is provided with a pair of perforations at each of the points 17 and bolts 18 are provided, one passing through each of the perforations. The pairs of bolts are arranged substantially as shown in Fig. 2, since the doves on the tub are to be of shape and arrangement substantially similar to the lugs 2 of Fig. 1.

Within the pattern body 16 are two transverse frame members, 19, 20, respectively. Each of these carries two guides 21, provided with grooves in which the bolts 18 reciprocate and covered with movable plates 22 to hold the bolts in position. Each frame member also carries two journal boxes 23 with movable caps in each of which is rotatably mounted a short shaft 24, (see Fig. 7), provided at each end with an eccentric pin 25, each of these engaging the slot formed in one of the bolts 18. Shafts 24 are annularly grooved at 26 and the grooves engaged by annular projections 27 formed in the journal boxes and caps to prevent endwise movement of the shaft.

It is evident that as short shafts 24 are rotated, the eccentric pins 25 will cause bolts 18 to reciprocate so that their outer ends alternately protrude from and are withdrawn into the body of the pattern. The following means are provided for rotating shafts 24 in unison.

Between the short shafts 24 on each side of the tub and co-axial with them is arranged a long shaft 28, each end of which rests in a socket in one end of one of the blocks 29. Set screws 30 fix shaft 28 revolubly with the blocks. Each of the blocks 29 has an eccentric bore 31 accommodating the end of one of the eccentric pins 25 and these pins are fixed revolubly with the blocks by set screws 32. In this manner each shaft 28 with the two short shafts on the same side of the pattern are made an operative unit and rotate together. One of the frame members 20 is provided with ways 33 in which a slide 34 reciprocates. The slide is provided with lugs 35, between which a cross-bar 36 is secured. Ways 33 carry two fixed cross-pieces 37 one above and one below cross-bar 36, each of which carries a set screw 38 by which the travel of the slide is regulated. The two blocks 29 adjacent to frame-member 20 are provided with jaws 39 to which the ends of cross-bar 36 are connected by pin and slot connections. A bar 40 crossing the molding stand 15 near the base provides a support for a bearing block 41. A bolt-operating shaft 42 is journaled in the block and passes through the stand 15, being provided outside the stand with a crank-arm 43 by which it may be rocked. At its inner end shaft 42 carries another crank-arm 44 connected by a link 45 with slide 34.

By moving crank-arm 43 shaft 42 is rocked, causing slide 34 to reciprocate; cross-bar 36 connected with arms 39 of blocks 29 thus rocks shafts 28 and eccentric pins 25 reciprocate bolts 18, as before described. The mold may be formed upon this pattern in different ways, which will be obvious from the foregoing description of the means of forming molds upon the simple pattern of Fig. 2.

Having described our invention, we claim:

In combination, a hollow bathtub pattern, a bearing connected therewith, operating mechanism mounted in said bearing, a plurality of supports within said pattern provided with bearings, levers mounted in said bearings, a plurality of sets of prongs adapted to project through said pattern, means connecting said levers and said prongs, means connecting said levers with said operating mechanism, and means for actuating said mechanism.

OSCAR H. MARSCHUETZ.
WILLIAM G. PROBST.
JOHN C. REED.

Witnesses for Oscar H. Marschuetz and William G. Probst:
ARCH WUNDERLICH,
J. D. MURPHY.

Witnesses for John C. Reed:
FRANK G. NEWTON,
GEO. A. YOUNG.

---

Copies of this patent may be obtained for five cents each, by addressing the "Commissioner of Patents, Washington, D. C."